United States Patent
Seo et al.

(10) Patent No.: US 9,758,197 B2
(45) Date of Patent: Sep. 12, 2017

(54) FIBER-REINFORCED PLASTIC VEHICLE BODY STRUCTURE AND MANUFACTURING METHOD THEREOF

(71) Applicant: HYUNDAI MOTOR COMPANY, Seoul (KR)

(72) Inventors: Seongwook Seo, Seoul (KR); Dae Seung Kim, Gyeonggi-do (KR); Log Won Do, Gyeonggi-do (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/102,366

(22) Filed: Dec. 10, 2013

(65) Prior Publication Data

US 2014/0183902 A1    Jul. 3, 2014

(30) Foreign Application Priority Data

Dec. 27, 2012 (KR) .................. 10-2012-0155393

(51) Int. Cl.
| | |
|---|---|
| *B62D 25/06* | (2006.01) |
| *B62D 29/04* | (2006.01) |
| *B62D 23/00* | (2006.01) |
| *B29C 70/44* | (2006.01) |
| *B29C 70/86* | (2006.01) |
| *B29L 31/30* | (2006.01) |

(52) U.S. Cl.
CPC ............ *B62D 29/043* (2013.01); *B29C 70/44* (2013.01); *B29C 70/865* (2013.01); *B62D 23/005* (2013.01); *B62D 25/06* (2013.01); *B62D 29/048* (2013.01); *B29L 2031/30* (2013.01); *Y10T 156/1044* (2015.01)

(58) Field of Classification Search
CPC .............................. B62D 23/00; B62D 25/06
See application file for complete search history.

(56) References Cited

U.S. PATENT DOCUMENTS

| | | | | |
|---|---|---|---|---|
| 2,406,863 | A * | 9/1946 | Swann ................. | B61D 17/12 105/410 |
| 3,823,518 | A * | 7/1974 | Allen ................... | B61D 17/12 52/309.3 |
| 4,986,597 | A * | 1/1991 | Clausen ............... | B62D 21/00 29/412 |
| 5,201,432 | A * | 4/1993 | Elvin-Jensen ................. | 220/1.5 |
| 5,332,281 | A * | 7/1994 | Janotik ................ | B62D 21/02 296/203.03 |
| 5,988,074 | A * | 11/1999 | Thoman ................... | 105/404 |
| 6,022,070 | A * | 2/2000 | Ashina ................ | B62D 23/005 296/205 |

(Continued)

FOREIGN PATENT DOCUMENTS

| | | |
|---|---|---|
| CN | 87102925 A | 2/1988 |
| CN | 101151142 A | 3/2008 |

(Continued)

*Primary Examiner* — Hilary Gutman
(74) *Attorney, Agent, or Firm* — McDermott Will & Emery LLP

(57) ABSTRACT

A fiber-reinforced vehicle body structure includes a first frame made of fiber-reinforced plastic or carbon fiber-reinforced plastic and having multiple sections, and a second frame that continuously extends from any one of the multiple sections of the first frame.

9 Claims, 12 Drawing Sheets

(56) References Cited

U.S. PATENT DOCUMENTS

| | | | |
|---|---|---|---|
| 6,092,472 A * | 7/2000 | Thoman | B61D 17/005 105/396 |
| 6,374,546 B1 * | 4/2002 | Fecko et al. | 52/17 |
| 6,604,781 B2 * | 8/2003 | Uchida | 296/204 |
| 6,854,791 B1 * | 2/2005 | Jaggi | 296/203.01 |
| 7,125,067 B2 * | 10/2006 | Bonnett | B60J 5/0416 296/146.5 |
| 7,251,915 B2 * | 8/2007 | Zimmerman et al. | 52/239 |
| 8,919,696 B2 * | 12/2014 | Lonsdorfer et al. | 244/119 |
| 2006/0266472 A1 | 11/2006 | Kipp et al. | |
| 2008/0001437 A1 * | 1/2008 | Balzer | B62D 23/005 296/203.03 |
| 2010/0186889 A1 | 7/2010 | Kipp et al. | |
| 2010/0237661 A1 * | 9/2010 | Baccouche | B62D 25/06 296/210 |
| 2012/0161476 A1 * | 6/2012 | Baccouche et al. | 296/203.01 |
| 2012/0263521 A1 * | 10/2012 | Auer et al. | 403/218 |
| 2014/0110964 A1 * | 4/2014 | Schijve et al. | 296/146.6 |
| 2014/0159425 A1 * | 6/2014 | Kim | B62D 25/06 296/191 |
| 2014/0197664 A1 * | 7/2014 | Ezzat et al. | 296/203.01 |
| 2014/0300142 A1 * | 10/2014 | Gneiting | B62D 25/06 296/210 |
| 2015/0137558 A1 * | 5/2015 | Ayuzawa | B62D 25/2036 296/193.07 |
| 2015/0158532 A1 * | 6/2015 | Ayuzawa | B62D 25/2009 296/193.07 |
| 2015/0251708 A1 * | 9/2015 | Kim | B62D 25/04 296/203.01 |

FOREIGN PATENT DOCUMENTS

| | | |
|---|---|---|
| CN | 101213061 A | 7/2008 |
| CN | 102458790 A | 5/2012 |
| DE | 3418110 A1 | 11/1985 |
| DE | 102010033289 A1 * | 2/2012 |
| JP | 05286364 A * | 11/1993 |
| JP | 2000038157 A * | 2/2000 |
| JP | 2008-540170 A | 11/2008 |
| JP | 2008-542090 A | 11/2008 |
| JP | 2009-234145 A | 10/2009 |

* cited by examiner

-- Prior Art --

FIBER-REINFORCED PLASTIC VEHICLE BODY STRUCTURE AND MANUFACTURING METHOD THEREOF

CROSS-REFERENCE TO RELATED APPLICATION

This application claims priority to and the benefit of Korean Patent Application No. 10-2012-0155393 filed in the Korean Intellectual Property Office on Dec. 27, 2012, the entire contents of which are incorporated herein by reference.

BACKGROUND (a) Field

The present disclosure relates to a fiber-reinforced plastic vehicle body structure.

(b) Description of the Related Art

Conventionally, steel is used to manufacture the structural components of a vehicle's body. In recent years, however, fiber-reinforced plastic (FRP) or carbon fiber-reinforced plastic (CFRP) is being used instead for vehicle body structures, which reflects the modern trend toward more lightweight vehicles that have improved fuel consumption.

In the manufacture of a vehicle body structure using the fiber-reinforced plastic or carbon fiber-reinforced plastic, the vehicle body structure is molded by preparing a foam core of a predetermined shape, wrapping prepreg fibers around the foam core, inserting the wrapped foam core into a mold, and then, applying heat and pressure to the mold.

After molding a lightweight plastic vehicle body structure as stated above, each part constituting a vehicle body is connected to other vehicle body structures, thereby forming the vehicle body.

FIG. 1 shows an example of when configuring part of a vehicle body by connecting a second vehicle body structure 20 having a plurality of barrier ribs 22 to a first vehicle body structure 10 having an approximately π-shaped channel, a connecting flange 24 extending in width is formed at the tip end of the second vehicle body structure 20.

Next, an adhesive 26 is applied to the connecting flange 24 to bond the connecting flange 24 and the first vehicle body structure 10 together. Also, in order to strengthen the bond, a screw or bolt is fastened to the connecting flange 24 to interconnect the first vehicle body structure 10 and the second vehicle body structure 20.

When a vehicle body is configured by connecting two vehicle body structures 10 and 20, as shown in FIG. 1, by bonding them with an adhesive and mechanically fastening them, the carbon fiber that connects the two vehicle body structures 10 and 20 is discontinuous, thus deteriorating the physical properties and strength of the connecting portions.

Moreover, there is a risk that the connecting portions might be damaged or broken due to stress caused by external loads, and the resulting degradation in their strength. Besides, resistance to collision or impact may be degraded since load weight may not be properly distributed between the first vehicle body structure 10 and the second vehicle body structure 20. Furthermore, a decrease in productivity or increase in production costs may result, due to having to undertake an additional process for interconnecting the first and second vehicle body structures 10 and 20.

SUMMARY

The present disclosure relates to a fiber-reinforced plastic vehicle body structure and a method for manufacturing such a vehicle body structure. In an embodiment, a vehicle body structure is made of multiple fiber-reinforced plastic sections that are connected so as to form a continuous and seamless or uniform structure, and increase the relative physical properties, strength, and degree of design freedom of the vehicle body structure.

An exemplary embodiment of the present disclosure provides a fiber-reinforced vehicle body structure including: a first frame made of fiber-reinforced plastic or carbon fiber-reinforced plastic and having multiple sections; and a second frame that continuously extends from any one of the multiple sections of the first frame.

The multiple sections of the first frame may include three or more sections which are connected together.

The multiple sections of the first frame may have a trapezoidal shape or triangular shape.

The second frame may be perpendicular to the first frame and form an L-shape.

Any one of the multiple sections of the first frame may be the section located at the right side of the L-shape.

The first and second frames may be joined to form a continuous frame in a T-shape.

Each of the multiple sections of the first frame may be configured in such a manner that a foam core is coated with the fiber-reinforced plastic or the carbon fiber-reinforced plastic.

The first frame may include two horizontal frames, the second frame may include two vertical frames that integrally connect the end portions of the two horizontal frames and a center frame that is connected to the first frame in the middle along the lengthwise direction of the horizontal frames, and the first frame and the second frame may form roof rails. Any one of the multiple sections of the first frame may be the selected as the middle section.

Another embodiment of the present disclosure provides a method for manufacturing a fiber-reinforced vehicle body structure, the method including the steps of: preparing a plurality of foam cores; wrapping and coating the plurality of foam cores with prepreg; preparing a preliminary assembly by laminating the plurality of foam cores coated with the prepreg; setting up the preliminary assembly on a mold; inserting the mold into a molding machine and applying heat and pressure; and taking out a molded end product.

The plurality of foam cores may be made of foamed plastic material.

The prepreg may be prepared by impregnating a fiber-reinforced plastic sheet or carbon fiber-reinforced plastic sheet with epoxy.

The plurality of foam cores may include a main foam core and a multisectional foam core.

The main foam core may include: a rectangular bar-like main body; and a triangular bar-like sub body, and the multisectional foam core may have a triangular bar-like shape.

The mold may include: a die on which the preliminary assembly is mounted; and a vacuum bag for wrapping and sealing the preliminary assembly.

The molding machine may include: a pressure chamber having a housing space for housing the mold; a heater for heating the pressure chamber; a compressor for supplying air or gas to the compression chamber to apply pressure; and a vacuum generator for sucking the air or gas within the vacuum bag.

DETAILED DESCRIPTION OF THE EMBODIMENTS

Hereinafter, the present disclosure will be described in detail using exemplary embodiments with reference to the accompanying drawings. In an embodiment, a fiber-reinforced vehicle body structure is formed using multiple sections that are continuously joined without any seams. The fiber-reinforced vehicle body structure may be formed in a particular shape, such as an L-shape or T-shape, as desired for a particular implementation. The fiber-reinforced vehicle body structure and manufacturing techniques disclosed herein provide several advantages over conventional solutions. First, the fiber-reinforced vehicle body structure disclosed obviates the need to connect another target structure for mitigating physical property degradation and stress concentration at connecting portions caused by external loads. Moreover, the fiber-reinforced vehicle body structure of the present disclosure allows the impact or weight of an external load to be appropriately transferred from one part of the vehicle body to another through the continuous sections. This also improves the vehicle body structure's ability to effectively handle the impact of an external load during a collision.

In addition, any bonding process for connecting to other vehicle body structures or any additional mechanical process may be used, because carbon fiber-reinforced plastic can be molded into a particular shape by using plastic foam. Accordingly, productivity may be increased, while manufacturing costs may be decreased.

Furthermore, as will be described in further detail below, the relative strength or stress resistance of different parts of the vehicle body structure may be adjusted by varying the shape of multiple sections according to the specific purpose of each part of the vehicle body structure, which provides a greater degree of design freedom.

Figure 1:
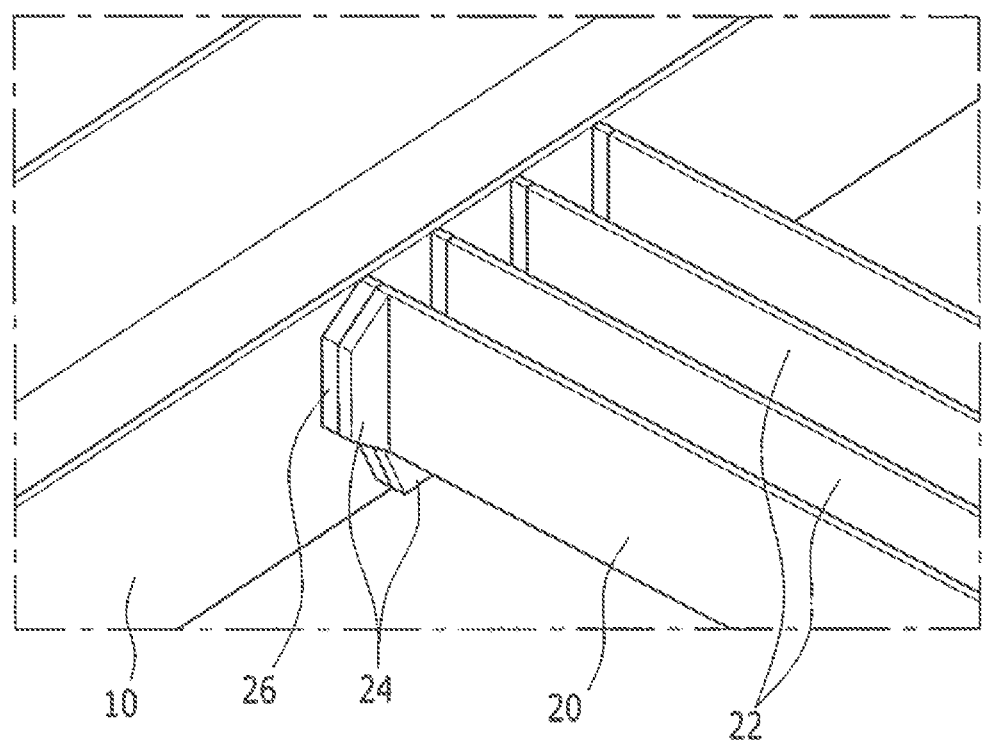
FIG. 1 illustrates the connection of vehicle body structures made of fiber-reinforced plastic according to the conventional art.
Figure 2:
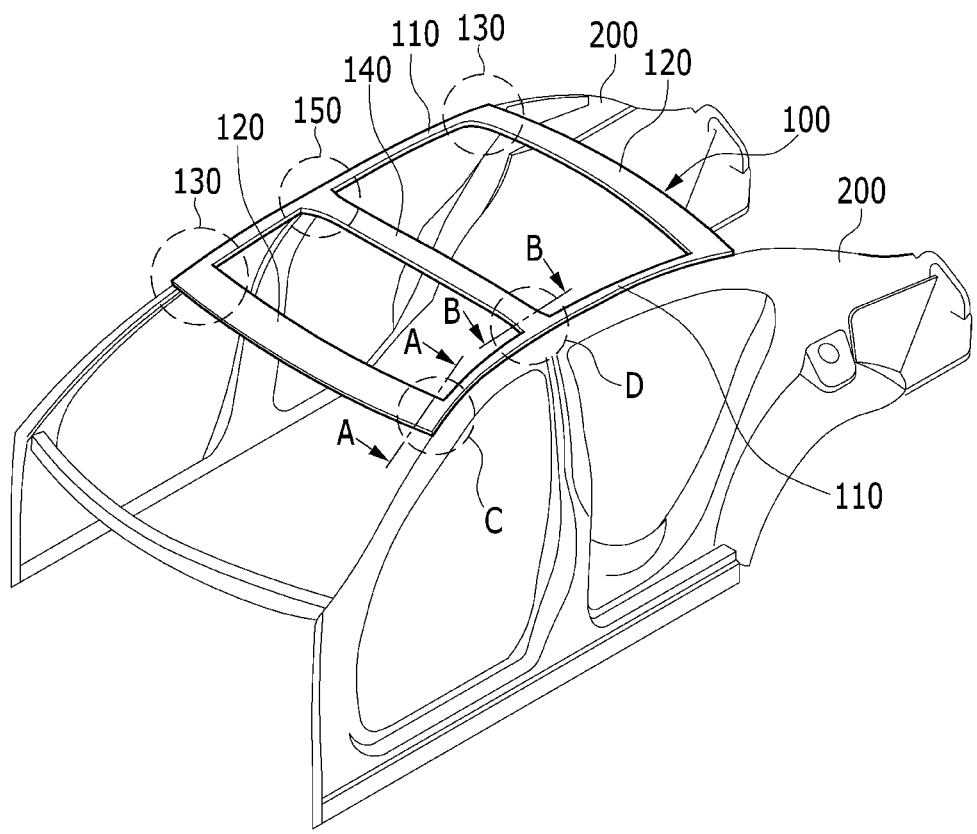
FIG. 2 is a perspective view of a vehicle body structure made of fiber-reinforced plastic that forms part of a vehicle body.

FIG. 2 illustrates an exemplary vehicle body structure 100 made of fiber-reinforced plastic, which may be coupled to other parts of the vehicle body to form part of the vehicle body. The vehicle body structure 100 in this example forms roof rails to be coupled with a lateral vehicle body 200. However, it should be noted that the vehicle body structure 100 is not limited thereto and that the vehicle body structure 100 may form other parts of the vehicle body, for example, a lateral vehicle body, a frame, or a panel.

As shown in FIG. 2, the vehicle body structure 100 is in a rectangular shape. The vehicle body structure 100 includes two horizontal frames 110 that longitudinally extend along the length of the vehicle. The horizontal frames 110 are spaced apart from each other along the width of the vehicle. The vehicle body structure 100 also includes two vertical frames 120 that extend along the width of the vehicle. The two vertical frames 120 are longitudinally spaced apart from each other along the length of the vehicle, and integrally connect the tip ends of the two horizontal frames.

The tip ends of the horizontal frames 110 and vertical frames 120 meet to form four L-shaped connecting portions 130.

Moreover, a center frame 140 (or a third frame) is formed along the width of the vehicle in the middle along the lengthwise direction of the horizontal frames 110, so that T-shaped connecting portions 150 are formed at locations where the center frame 140 and the horizontal frames 110 meet.

Figure 3:
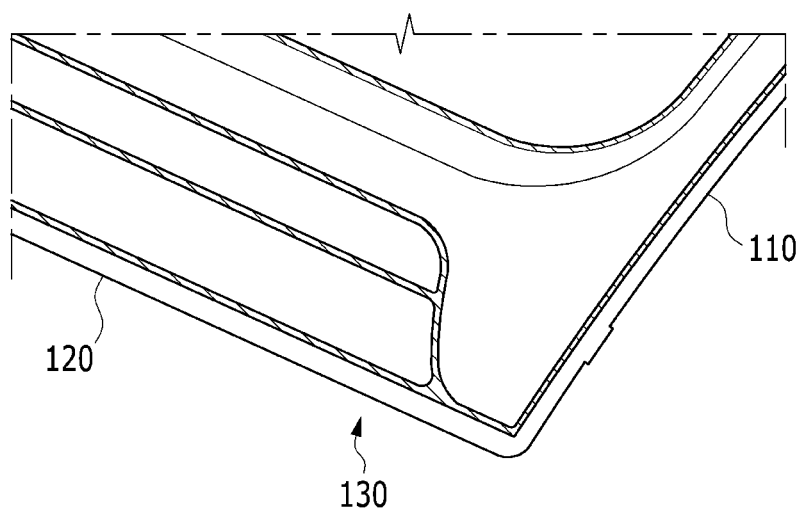
FIG. 3 is an enlarged cross-sectional view of portion C of the vehicle body structure shown in FIG. 2.
Figure 4:
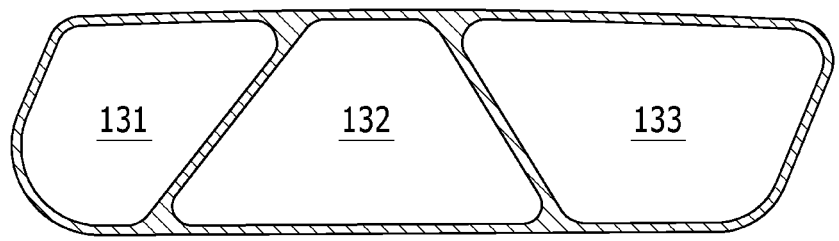
FIG. 4 is a cross-sectional view taken along line A-A of the vehicle body structure shown in FIG. 2.

FIGS. 3 and 4 illustrate that the L-shaped connecting portions 130 of portion C of the vehicle body structure shown in FIG. 2 are not formed by bonding the tip ends of the horizontal frames 110 and vertical frames 120 together, but instead are integrally formed without seams.

As shown in FIG. 4, each of the L-shaped connecting portions 130 may include three sections 131, 132, and 133 which are connected together. Each of the three sections 131, 132, and 133 may be configured in such a manner that prepreg is wrapped around a foam core to be described later.

The three sections 131, 132, and 133 may be formed, for example, in the shape of an approximate trapezoid.

Any one of the three sections 131, 132, and 133 may be a connecting section.

That is, the connecting section 133 may have an L-shape that integrally and continuously connects the horizontal frame 110 and the vertical frame 120.

If the connecting section 133 is formed in the L-shape, the connecting section 133 may be configured to be the section at a side (e.g., the right side) of the L-shape so as to receive as little moment as possible.

Figure 5:
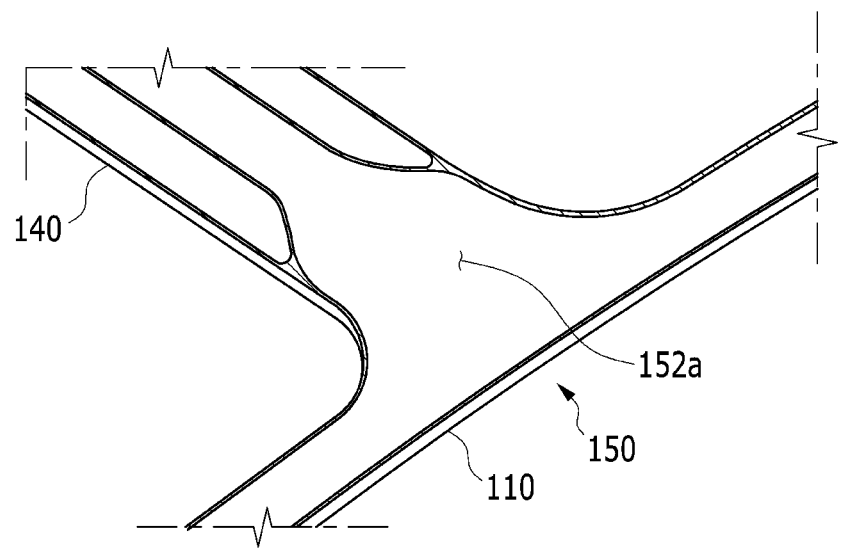
FIG. 5 is an enlarged cross-sectional view of portion D of the vehicle body structure shown in FIG. 2.
Figure 6:
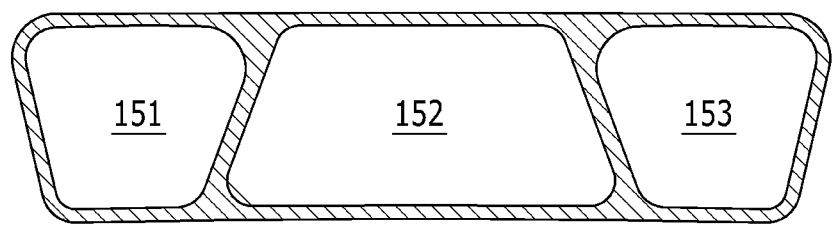
FIG. 6 is a cross-sectional view taken along line B-B of the vehicle body structure shown in FIG. 2.

Referring to FIG. 5 and FIG. 6, the T-shaped connecting portions 150 are not formed by bonding the horizontal frames 110 and the central frame 140 together, but instead each of these connecting portions 150 is integrally formed without seams.

As shown in FIG. 6, each of the T-shaped connecting portions 150 may include three sections 151, 152, and 153 which are connected together. Each of the three sections 151, 152, and 153 may be configured in such a manner that prepreg is wrapped around a foam core to be described later.

The three sections 151, 152, and 153 may be formed in the shape of an approximate trapezoid.

Any one 152 of the three sections 151, 152, and 153 may be a connecting section.

That is, the connecting section 152 may have a T-shape that integrally and continuously connects a horizontal frame 110 and the central frame 140.

If the connecting section 152 is formed in the T-shape, the connecting section 152 may be configured to be the section at the middle, taking the moment into consideration.

The connecting section 152 may include a connecting portion 152a horizontally extending over the entire width of the central frame 140 and being integrally connected to the horizontal frame 110.

The examples illustrated in FIG. 7 to FIG. 12 will be used to describe various steps of an exemplary method for manufacturing a fiber-reinforced plastic vehicle body structure.

Figure 7:
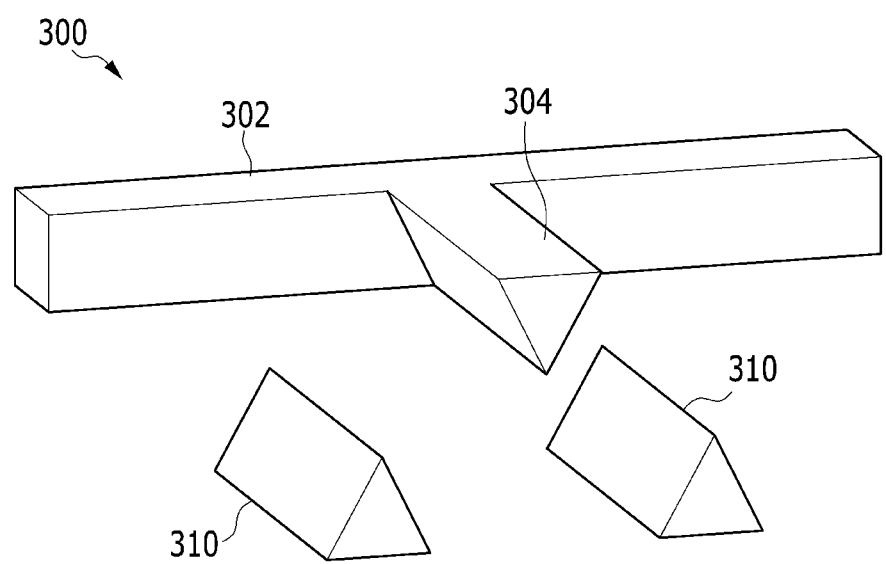
FIG. 7 is an exploded perspective view of a T-shaped multisectional foam core according to an exemplary embodiment of the present invention.

Referring to FIG. 7, first of all, the shape of a vehicle body structure is selected, and then a foam core is prepared.

Although FIG. 7 illustrates a T-shaped vehicle body structure, an L-shaped or other vehicle body structure may be manufactured.

In this example, a T-shaped vehicle body structure is formed by separately preparing a T-shaped foam core 300 (or main foam core) and one or more multisectional foam core(s) 310.

While two multisectional foam cores 310 are shown in FIG. 7, additional multisectional foam cores may be prepared as desired for a particular implementation.

As shown in FIG. 7, the T-shaped foam core 300 includes a rectangular bar-like main body 302 and a triangular bar-like sub body that vertically and integrally extends from the main body.

The two multisectional foam cores 310 have the same triangular bar-like shape as the sub body 304.

The foam cores 300 and 310 may be made of foamed plastic material.

Figure 8:
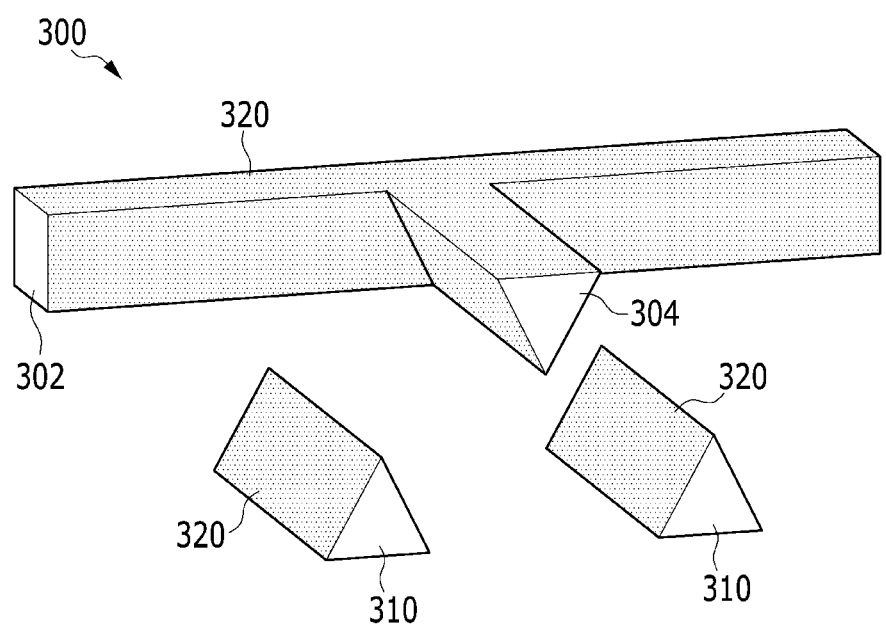
FIG. 8 is a perspective view showing a T-shaped multisectional foam core wrapped with prepreg according to an exemplary embodiment of the present invention.

In FIG. 8, prepreg 320 is wrapped around the outer side surfaces of the T-shaped foam core 300 and multisectional foam cores 310.

The prepreg 320 is a semi-hardened molding material which is prepared by pre-impregnated a fiber-reinforced plastic (FRP) sheet or carbon fiber-reinforced plastic (CFRP) sheet with epoxy. It should be noted that the fibers of the fiber-reinforced plastic may be made of carbon or any of various other types of materials including, for example and without limitation, glass, basalt, and the like.

Figure 9:
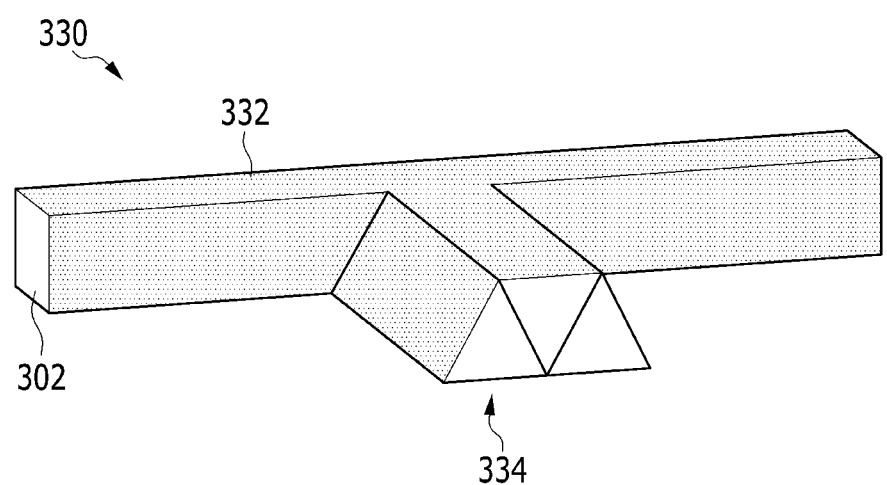
FIG. 9 is a perspective view showing a preliminary assembly, which is prepared by wrapping and laminating a T-shaped multisectional foam core with prepreg, according to an exemplary embodiment of the present invention.

Referring to FIG. 9, the multisectional foam cores 310 wrapped with the prepreg 320 are laminated onto both side surfaces of the sub body 304 of the T-shaped foam core 300 wrapped with the prepreg 320, thereby preparing a preliminary assembly 330.

Once the multisectional foam cores 310 are laminated on the T-shaped foam core 300, a multisectional trapezoid is formed by joining three triangular sections together.

That is, the preliminary assembly 330 is configured in such a manner that a connecting body 334 having a multisectional trapezoidal shape is integrally connected to the rectangular bar-like main body 332 wrapped with the prepreg 320.

Figure 10:
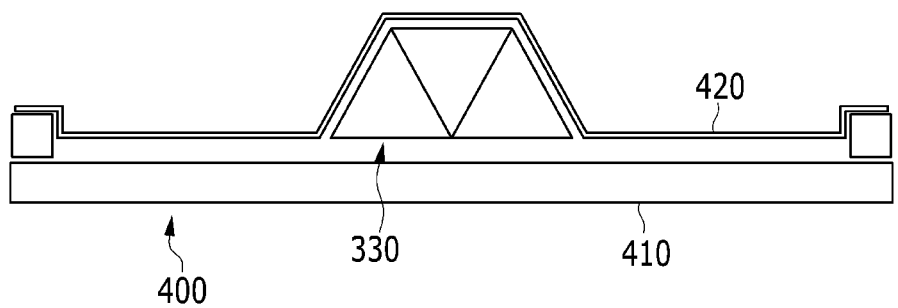
FIG. 10 is a cross-sectional view showing that a preliminary assembly, which is prepared by wrapping and laminating a T-shaped multisectional foam core with prepreg, is set up on a mold according to an exemplary embodiment of the present invention.

In FIG. 10, the preliminary assembly 330 is mounted on a mold 400. In this example, the mold 400 may include a die 410 on which the preliminary assembly 300 is mounted and a vacuum bag 420 for covering and wrapping the preliminary assembly 330 mounted on the die 410 and sealing it.

Figure 11:
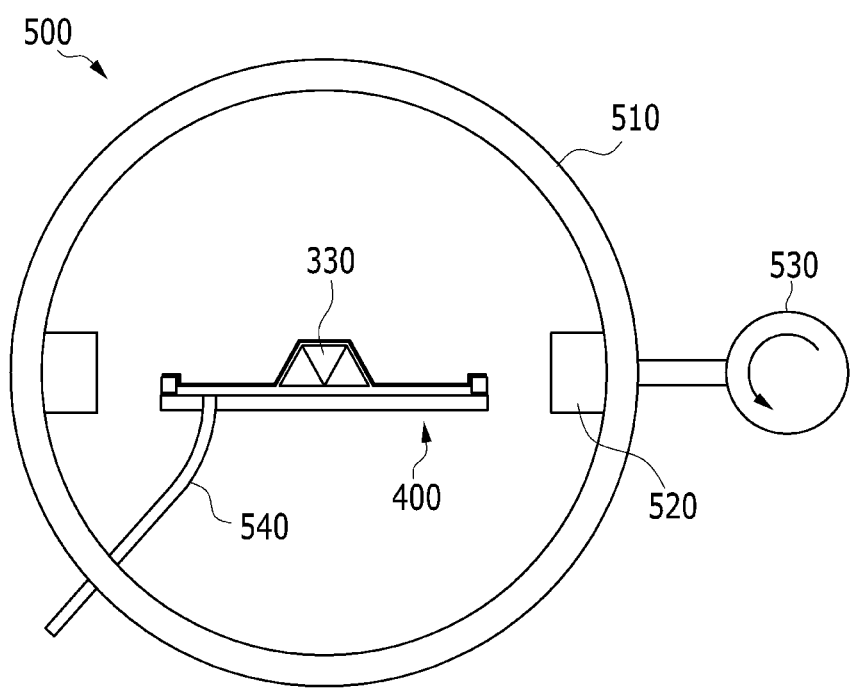
FIG. 11 is a state diagram showing that a preliminary assembly, which is prepared by wrapping and laminating a T-shaped multisectional foam core with prepreg, is set up on a mold and inserted into a molding machine according to an exemplary embodiment of the present invention.

Referring to FIG. 11, the mold 400 where the preliminary assembly 330 is mounted, as described above, is inserted into a molding machine 500.

The molding machine 500 includes a pressure chamber 510, which is approximately circular in shape and has a housing space for housing the mold 400.

A heater 520 is installed within the pressure chamber 510 to heat the pressure chamber 510.

Additionally, a compressor 530 is installed in the pressure chamber 510. The compressor 530 may be configured to, for example, compress and supply gas or air to the pressure chamber 510. A vacuum generator (not shown) may also be installed for vacuuming or sucking the air or gas within the vacuum bag 420. The inside of the vacuum bag 520 is connected to the vacuum bag 420 via a vacuum hose or a vacuum pipe 540.

The molding machine 500 is adapted to mold the preliminary assembly 330 into an end product by applying heat and pressure to the preliminary assembly 330 mounted therein by the heater 520 and the compressor 530.

The aforementioned vacuum generator may also serve to suck and eliminate air bubbles or gas that may be generated when heat and pressure are applied to the preliminary assembly 330.

Figure 12:
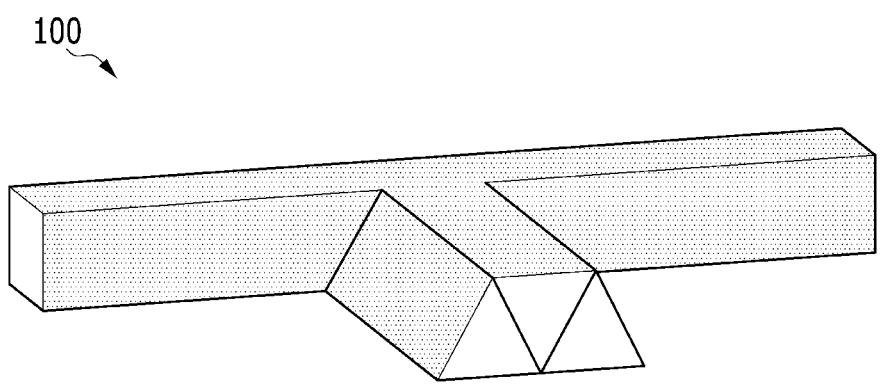
FIG. 12 is a perspective view showing a finished T-shaped vehicle body structure according to an exemplary embodiment of the present invention.

After the molding machine 500 is done molding the preliminary assembly 330, the end product produced by the molding machine 500 is a complete vehicle body structure 100 made of fiber-reinforced plastic or carbon fiber-reinforced plastic, as shown in FIG. 12.

While the manufacturing method of the vehicle body structure of the present disclosure has been illustrated with respect to the T-shaped vehicle body structure, vehicle body structures in any of various shapes may be manufactured including, but not limited to, an L-shaped vehicle body structure, a combined vehicle body structure, such as roof rails combining the L-shaped vehicle body structure and the T-shaped vehicle body structure, a lateral vehicle body structure, a panel, or a frame.

While the subject matter of the present disclosure has been described herein using exemplary embodiments, it is to be understood that this subject matter is not limited to the disclosed embodiments, but, on the contrary, is intended to cover various modifications and equivalent arrangements included within the spirit and scope of the appended claims, as set forth below.

<Description of symbols>

| | |
|---|---|
| 100: vehicle body structure | 110: horizontal frame |
| 120: vertical frame | 130: L-shaped connecting portion |
| 140: center frame | 150: T-shaped connecting portion |
| 200: lateral vehicle body | 300: T-shaped foam core |
| 310: multisectional foam core | 320: prepreg |
| 330: preliminary assembly | 400: mold |
| 410: die | 420: vacuum bag |
| 500: molding machine | 510: pressure chamber |
| 520: heater | 530: compressor |
| 540: vacuum pipe | |

What is claimed is:

1. A fiber-reinforced vehicle body structure comprising:
   a first frame having multiple compartments, each having a closed space made of fiber-reinforced plastic, joined together without seams; and
   a second frame that continuously extends from at least one of the multiple compartments of the first frame,
   wherein the second frame comprises two horizontal frames, each of the two horizontal frames includes three compartments,
   wherein the first frame comprises: two vertical frames that integrally connect only ends of the two horizontal frames; and a center vertical frame that is directly connected to the second frame in the middle in a length direction of the horizontal frames, wherein the first frame and the second frame form roof rails, wherein each of the two vertical frames of the first frame is formed by any one of the three compartments of each of the two horizontal frames to form L-shaped connecting portions, and wherein the center frame is formed by a central compartment of the three compartments of each of the two horizontal frames to form T-shaped connecting portions.

2. The fiber-reinforced vehicle body structure of claim 1, wherein the multiple compartments of the first frame comprise three or more compartments which are connected together.

3. The fiber-reinforced vehicle body structure of claim 1, wherein the multiple compartments of the first frame have a trapezoidal shape.

4. The fiber-reinforced vehicle body structure of claim 1, wherein the second frame is perpendicular to the first frame and forms an L-shape.

5. The fiber-reinforced vehicle body structure of claim 4, wherein any one of the multiple compartments of the first frame is the compartment at a side of the L-shape.

6. The fiber-reinforced vehicle body structure of claim 1, wherein the second frame forms a T-shape together with a middle compartment of the first frame.

7. The fiber-reinforced vehicle body structure of claim 6, wherein the middle compartment of the first frame is located in a center of the first frame.

8. The fiber-reinforced vehicle body structure of claim 1, wherein each of the multiple compartments of the first frame is configured in such a manner that a foam core is coated with the fiber-reinforced plastic.

9. The fiber-reinforced vehicle body structure of claim 1, wherein the fiber-reinforced plastic is carbon fiber-reinforced plastic.

* * * * *